United States Patent [19]
Tropper

[11] Patent Number: 5,892,505
[45] Date of Patent: Apr. 6, 1999

[54] IMAGE VIEWING APPARATUS AND METHOD

[75] Inventor: Bryan M. Tropper, Arlington Heights, Ill.

[73] Assignee: Tropper Technologies, Inc., Arlington Heights, Ill.

[21] Appl. No.: 840,869

[22] Filed: Mar. 17, 1997

[51] Int. Cl.$^6$ .................................................... G09G 5/00
[52] U.S. Cl. ............................................................ 345/208
[58] Field of Search .............................. 345/208, 8, 156, 345/158; 463/30, 31, 32, 33; 273/148 B

[56] References Cited

U.S. PATENT DOCUMENTS

| | | | |
|---|---|---|---|
| 4,879,603 | 11/1989 | Berman | 358/242 |
| 5,368,309 | 11/1994 | Monroe et al. | 345/8 |
| 5,478,239 | 12/1995 | Fuerst et al. | 434/20 |
| 5,500,683 | 3/1996 | Yatomi et al. | 348/565 |
| 5,657,034 | 8/1997 | Yamazaki | 345/8 |

*Primary Examiner*—Richard A. Hjerpe
*Assistant Examiner*—Ronald Laneau
*Attorney, Agent, or Firm*—Matthew B. Tropper, Esq.

[57] ABSTRACT

An apparatus for displaying on a display screen a first image sequence exclusively to a first viewer and a second image sequence exclusively to a second viewer, the first image sequence including a respective plurality of image frames and the second image sequence including a respective plurality of image frames. A controller alternately displays in an interlaced fashion each of the image frames of the first image sequence and each of the image frames of the second image sequence on the display screen. The controller also generates a second viewer image block signal when each of the image frames of the first image sequence are displayed and a first viewer image block signal when each of the image frames of the second image sequence are displayed. A first viewer image blocking element responsive to the first viewer image block signal generated by the controller is provided for blocking the first viewer's view of the display screen when the first viewer image block signal is received and a second viewer image blocking element responsive to the second viewer image block signal from the controller is provided for blocking the second viewer's view of the display screen when the second viewer image block signal is received.

22 Claims, 7 Drawing Sheets

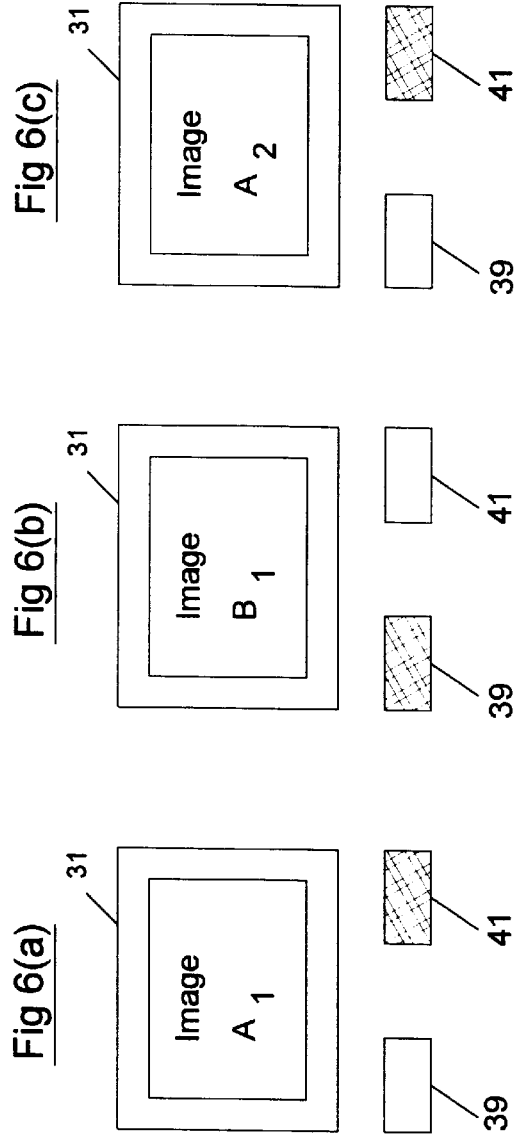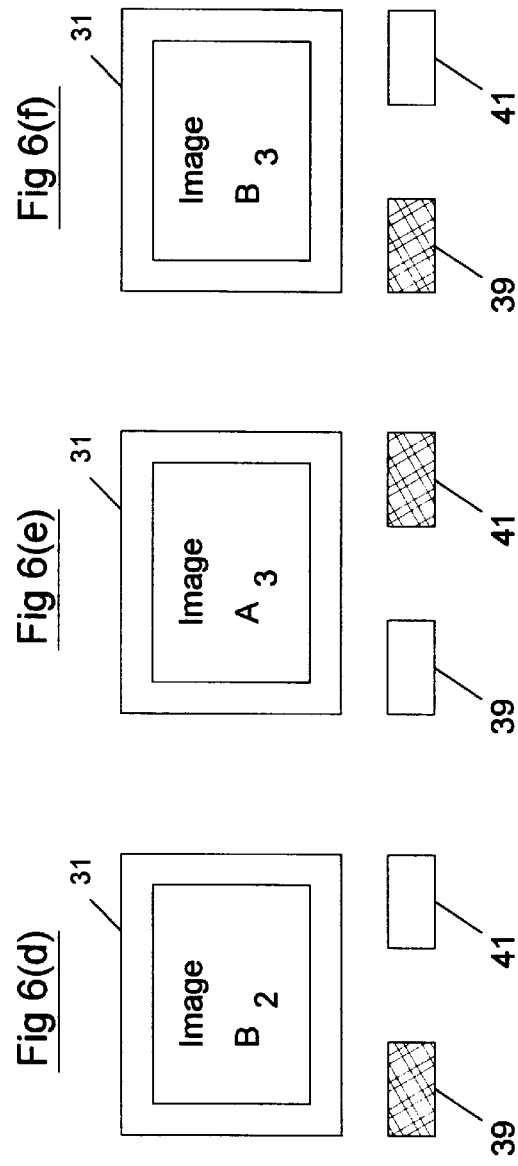

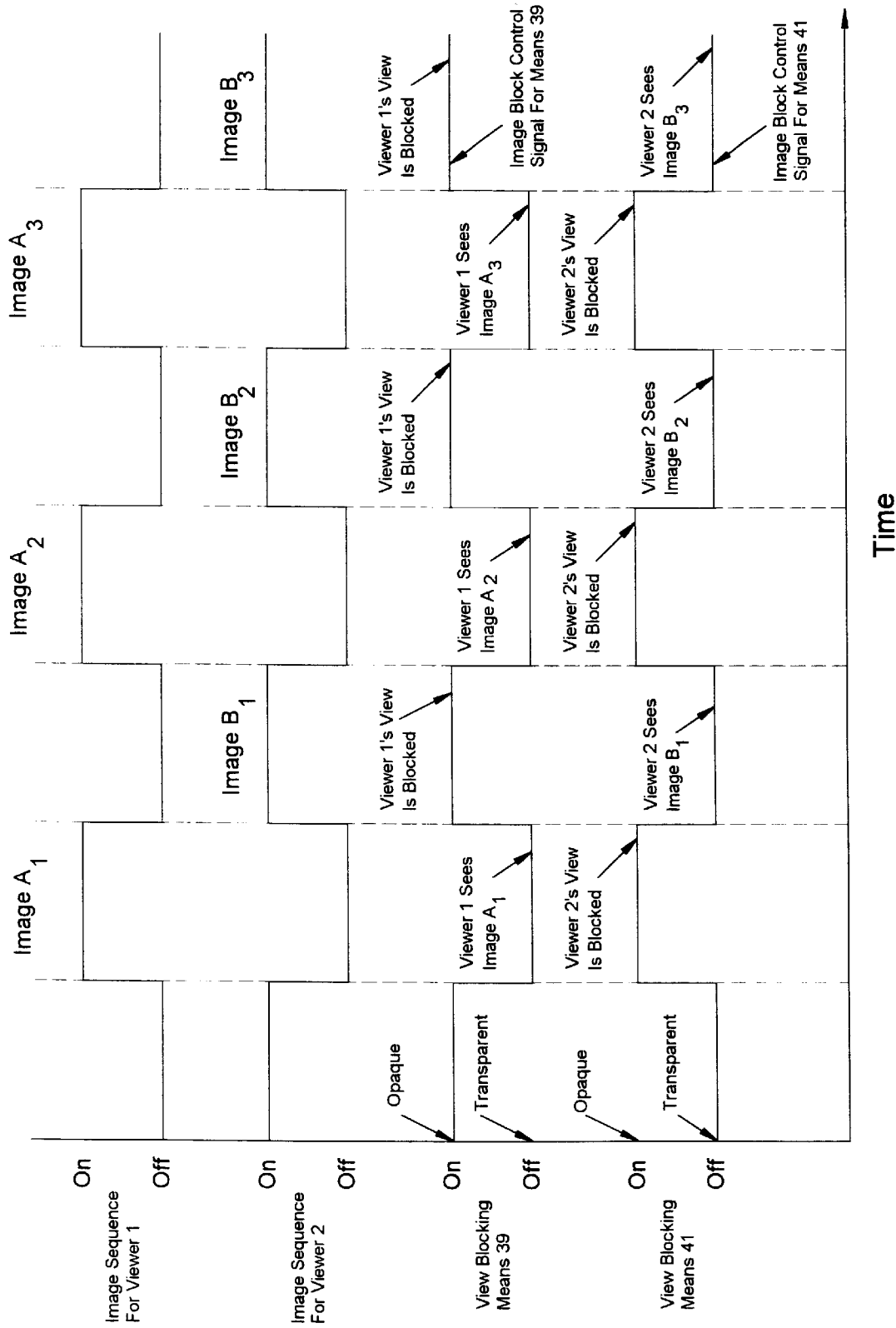

IMAGE VIEWING APPARATUS AND METHOD

BACKGROUND OF THE INVENTION

1. Field of the Invention

The instant invention relates to an apparatus and method for providing different images or sequences of images exclusively to respective ones of multiple viewers of a single monitor.

More particularly, the instant invention provides an apparatus and method to display one of a number of views of a computer simulation, video game, television program, or movie exclusively to a particular one of a number of viewers of a single monitor.

2. Description of the Related Art

Prior art computer simulations and video games fall into two categories by which multiple views are displayed to respective viewers.

The output of the first type of prior art system, which shall be referred to as a "split-screen" system, is shown in FIG. 1. In this split-screen system, a single monitor 1 is utilized to concurrently display a view seen by a first viewer and a view seen by a second viewer.

As seen in this Figure, in which a race game is shown, the screen of the monitor is divided in half and the first viewer's view (player 1's view) is shown in the top half, for example, and the second viewer's view (player 2's view) is shown in the bottom half, for example.

This prior art split-screen system suffers many disadvantages, however. To begin with, both viewers can see both halves of the screen. That is, the first viewer can see not only his view but also the second viewer's view. Likewise, the second viewer can see not only his view, but also the first viewer's view. This situation is clearly distracting to both viewers. Further, where the computer simulation or video game requires that the first viewer's view not be seen by the second viewer and that the second viewer's view not be seen by the first viewer, this type of system is clearly unacceptable.

Moreover, this split-screen system suffers from the disadvantage that the available display area for the first viewer's view is only half of the monitor screen area and the available display area for the second viewer's view is only half of the monitor screen area.

The output of the second type of prior art system, which shall be referred to as the "multiple monitor system", is shown in FIG. 2. As seen in this Fig., in which a tank combat simulation is shown, a first viewer is provided a monitor 21, on which a first view is shown and a second viewer is provided a monitor 23, on which a second view is shown. The monitors may be placed so that the first viewer can not see the second view on monitor 23 and so that the second viewer can not see the first view on monitor 21. For example, there may be a curtain 25 between the monitors 21 and 23 or the monitors may be in different rooms.

Since two monitors are required in this multiple monitor system, the system is relatively expensive and its use is generally limited to high-end systems, such as military training simulations. A derivation of this multiple monitor system (hereinafter "multiple head-mounted display system") employs individual head-mounted displays (usually in the form of LCD display screens) for each viewer. However, this derivation likewise suffers from the same disadvantages of the multiple monitor system described above, namely, since two head-mounted displays, each requiring the use of one or more active LCD display screens, are required, the system is relatively expensive. Moreover, conventional head-mounted display systems generally can not provide the resolution provided by stand-alone monitors.

OBJECTS AND SUMMARY OF THE INVENTION

It is therefore an object of the present invention to provide an apparatus for displaying different images or different sequences of images exclusively to each one of multiple viewers of a single monitor.

Another object of the present invention is to provide a method for displaying different images or different sequences of images exclusively to each one of multiple viewers of a single monitor.

By providing for the display of different images or different sequences of images exclusively to each one of multiple viewers of a single monitor the instant invention eliminates a major disadvantage associated with the conventional split-screen system, which was discussed above. That is, by utilizing the instant invention each viewer is able to exclusively view information relevant to him or her on the entire screen.

Moreover, by providing for the display of different images or different sequences of images exclusively to each one of multiple viewers of a single monitor the instant invention eliminates a major disadvantage associated with the multiple monitor system, which was discussed above. That is, the instant invention maximizes the usefulness of one of the most expensive components of a video game or computer system, namely, the monitor. Moreover, the instant invention overcomes a major disadvantage associated with the multiple head-mounted display system because the instant invention allows multiple users to view a relatively large, high-resolution monitor. other objects and advantages will become apparent from the detailed description, claims, and accompanying drawings.

BRIEF DESCRIPTION OF THE DRAWINGS

FIGS. 6(a)–6(f) depict the relationship between the display of two image sequences and the transparent and opaque states of two view blocking means according to the first embodiment of the instant invention;

FIG. 7 depicts a timing diagram for the first embodiment of the instant invention.

DETAILED DESCRIPTION OF THE PREFERRED EMBODIMENTS

Figure 1:
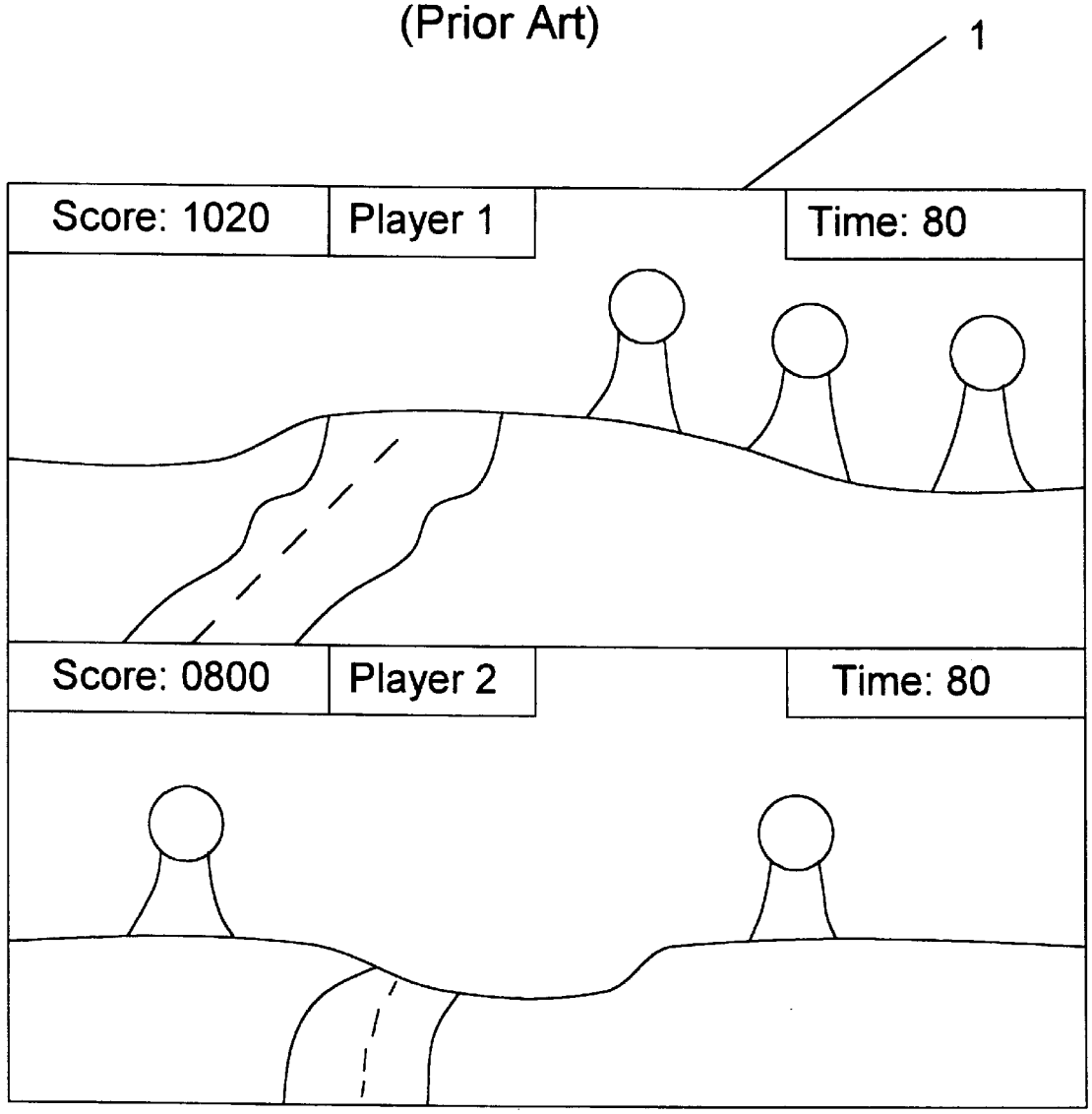
FIG. 1 shows two scenes displayed in a prior art split screen display system.
Figure 2:
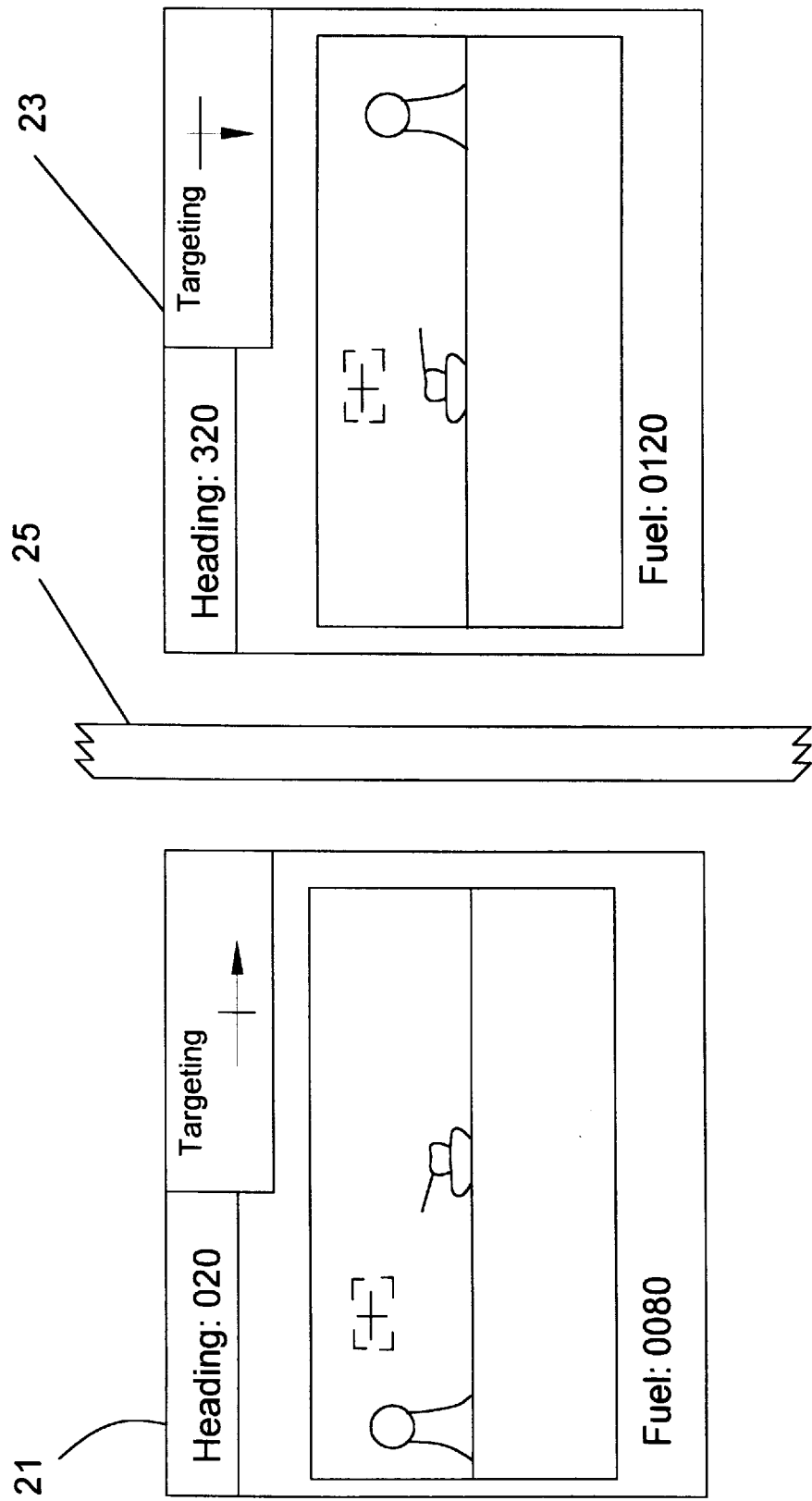
FIG. 2 shows two scenes displayed on two monitors in a prior art multiple monitor display system.

An apparatus for displaying a first image on a display screen exclusively to a first viewer and a second image on the display screen exclusively to a second viewer is provided, comprising control means for selectively displaying said first image and said second image on the display screen and for generating a second viewer image block signal when said first image is displayed and a first viewer image block signal when said second image is displayed, first viewer image blocking means responsive to said first viewer image block signal generated by said control means for blocking the first viewer's view of the display screen when said first viewer image block signal is received, and second viewer image blocking means responsive to said second viewer image block signal from said control means for blocking the second viewer's view of the display screen when said second viewer image block signal is received.

The first viewer image blocking means may comprise at least a first liquid crystal lens and said second viewer image blocking means may comprise at least a second liquid crystal lens, whereby said first liquid crystal lens turns from a substantially transparent state to a substantially opaque state when the first viewer image blocking means receives the first viewer image block signal and whereby said second liquid crystal lens turns from a substantially transparent state to a substantially opaque state when the second viewer image blocking means receives the second viewer image block signal.

The first liquid crystal lens of said first viewer image blocking means may be mounted to a first helmet and said second liquid crystal lens of said second viewer image blocking means may be mounted to a second helmet.

The first liquid crystal lens may comprise a first right eye lens and a first left eye lens and said second liquid crystal lens may comprise a second right eye lens and a second left eye lens. The first right eye lens and said first left eye lens of said first viewer image blocking means may be mounted to first eyeglass frames and said second right eye lens and said second left eye lens of said second viewer image blocking means may be mounted to second eyeglass frames.

The control means may generate the first viewer image block signal for a first viewer predetermined time period during which the first viewer image blocking means blocks the first viewer's view of the display screen and said control means may generate the second viewer image block signal for a second viewer predetermined time period during which the second viewer image blocking means blocks the second viewer's view of the display screen. The first viewer predetermined time period and said second viewer predetermined time period may be substantially equal.

The control means may generate a first viewer block release signal when said first image is displayed and a second viewer block release signal when said second image is displayed, whereby said first viewer image blocking means is responsive to said first viewer image block signal generated by said control means and said first viewer block release signal generated by said control means for blocking the first viewer's view of the display screen when said first viewer image block signal is received and for not blocking the first viewer's view of the display screen when said first viewer block release signal is received and whereby said second viewer image blocking means is responsive to said second viewer image block signal generated by said control means and said second viewer block release signal generated by said control means for blocking the second viewer's view of the display screen when said second viewer image block signal is received and for not blocking the second viewer's view of the display screen when said second viewer block release signal is received.

Another apparatus for displaying on a display screen a first image sequence exclusively to a first viewer and a second image sequence exclusively to a second viewer, said first image sequence including a respective plurality of image frames and said second image sequence including a respective plurality of image frames, is provided, comprising control means for alternately displaying in an interlaced fashion each of said image frames of said first image sequence and each of said image frames of said second image sequence on the display screen and for generating a second viewer image block signal when each of said image frames of said first image sequence are displayed and a first viewer image block signal when each of said image frames of said second image sequence are displayed, first viewer image blocking means responsive to said first viewer image block signal generated by said control means for blocking the first viewer's view of the display screen when said first viewer image block signal is received, and second viewer image blocking means responsive to said second viewer image block signal from said control means for blocking the second viewer's view of the display screen when said second viewer image block signal is received.

The first viewer image blocking means may comprise at least a first liquid crystal lens and said second viewer image blocking means may comprise at least a second liquid crystal lens, whereby said first liquid crystal lens turns from a substantially transparent state to a substantially opaque state when the first viewer image blocking means receives the first viewer image block signal and whereby said second liquid crystal lens turns from a substantially transparent state to a substantially opaque state when the second viewer image blocking means receives the second viewer image block signal.

The first liquid crystal lens of said first viewer image blocking means may be mounted to a first helmet and said second liquid crystal lens of said second viewer image blocking means may be mounted to a second helmet.

The first liquid crystal lens may comprise a first right eye lens and a first left eye lens and said second liquid crystal lens may comprise a second right eye lens and a second left eye lens.

The first right eye lens and said first left eye lens of said first viewer image blocking means may be mounted to first eyeglass frames and said second right eye lens and said second left eye lens of said second viewer image blocking means may be mounted to second eyeglass frames.

The control means may generate the first viewer image block signal for a first viewer predetermined time period during which the first viewer image blocking means blocks the first viewer's view of the display screen and said control means may generate the second viewer image block signal for a second viewer predetermined time period during which the second viewer image blocking means blocks the second viewer's view of the display screen. The first viewer predetermined time period and said second viewer predetermined time period may be substantially equal.

The control means may generate a first viewer block release signal when said first image is displayed and a second viewer block release signal when said second image is displayed, whereby said first viewer image blocking means is responsive to said first viewer image block signal generated by said control means and said first viewer block release signal generated by said control means for blocking the first viewer's view of the display screen when said first viewer image block signal is received and for not blocking the first viewer's view of the display screen when said first viewer block release signal is received and whereby second viewer image blocking means is responsive to said second viewer image block signal generated by said control means and said second viewer block release signal generated by said control means for blocking the second viewer's view of the display screen when said second viewer image block signal is received and for not blocking the second viewer's view of the display screen when said second viewer block release signal is received.

Another apparatus for displaying on a display screen, exclusively to each of n number of viewers, a respective one of n number of image sequences, each of said n number of image sequences including a respective plurality of image frames and each of said n number of image sequences being assigned to a respective one of said n number of viewers, is provided, comprising display means for alternately displaying on the display screen an image frame from each of said n image sequences in an interlaced fashion, whereby at any one time there is a single presently displayed image frame from one of said n number of image sequences which is viewed by the one of said n number of viewers to which the image sequence including the single presently displayed image frame is assigned, signal generation means for generating image frame view block signals in response to the display by the display means of the presently displayed frame, whereby the generated image frame view block signals correspond to all of the n number of viewers except for the one of said n number of viewers to which the image sequence including the single presently displayed image frame is assigned, and n number of viewer image blocking means, each corresponding to one of said n number of viewers, responsive to the image frame view block signals for selectively blocking all of said n number of viewer's views of the display screen except for the one of said n number of viewers to which the image sequence including the single presently displayed image frame is assigned.

The n number of viewer image blocking means may block all of said n number of viewer's views of the display screen except for the one of said n number of viewers to which the image sequence including the single presently displayed frame is assigned for a predetermined time period after said image frame view block signals are received. The number n may be in the range of 2 to 10.

The display screen of the invention may be incorporated into one of an NTSC format television, a PAL format television, and a High Definition television, for example.

Also provided is a method for displaying a first image on a display screen exclusively to a first viewer and a second image on the display screen exclusively to a second viewer, comprising displaying said first image and said second image on the display screen in an interlaced fashion, generating a second viewer image block signal when said first image is displayed and a first viewer image block signal when said second image is displayed, blocking the first viewer's view of the display screen when said first viewer image block signal is generated, and blocking the second viewer's view of the display screen when said second viewer image block signal is generated.

The first viewer's view of the display screen may be blocked for a first viewer predetermined time period after said first viewer image block signal is generated and said second viewer's view of the display screen may be blocked for a second viewer predetermined time period after said second viewer image block signal is generated. The first viewer predetermined time period and said second viewer predetermined time period may be substantially equal.

The method may further comprise generating a first viewer block release signal when said first image is displayed and a second viewer block release signal when said second image is displayed, whereby said first viewer's view of the display screen is blocked only when said first viewer image block signal is generated and is not blocked when said first viewer block release signal is generated and whereby said second viewer's view of the display screen is blocked only when said second viewer image block signal is generated and is not blocked when said second viewer block release signal is generated.

Another method for displaying on a display screen a first image sequence exclusively to a first viewer and a second image sequence exclusively to a second viewer, said first image sequence including a respective plurality of image frames and said second image sequence including a respective plurality of image frames, is provided, comprising alternately displaying each of said respective plurality of image frames of said first image sequence and each of said respective plurality of image frames of said second image sequence in an interlaced fashion on the display screen, generating a second viewer image block signal when each of said image frames of said first image sequence are displayed and a first viewer image block signal when each of said image frames of said second image sequence are displayed, blocking the first viewer's view of the display screen when said first viewer image block signal is generated, and blocking the second viewer's view of the display screen when said second viewer image block signal is generated.

The first viewer's view of the display screen may be blocked for a first viewer predetermined time period after said first viewer image block signal is generated and said second viewer's view of the display screen may be blocked for a second viewer predetermined time period after said second viewer image block signal is generated. The first viewer predetermined time period and said second viewer predetermined time period may be substantially equal.

The method may further comprise generating a first viewer block release signal when each of said image frames of said first image sequence are displayed and a second viewer block release signal when each of said image frames of said second image sequence are displayed, whereby said first viewer's view of the display screen is blocked only when said first viewer image block signal is generated and is not blocked when said first viewer block release signal is generated and whereby said second viewer's view of the display screen is blocked only when said second viewer image block signal is generated and is not blocked when said second viewer block release signal is generated.

Another method for displaying on a display screen, exclusively to each of n number of viewers, a respective one of n number of image sequences, each of said n number of image sequences including a respective plurality of image frames and each of said n number of image sequences being assigned to a respective one of said n number of viewers, is provided, comprising alternately displaying on the display screen an image frame from each of said n image sequences in an interlaced fashion, whereby at any one time there is a single presently displayed image frame from one of said n number of image sequences which is viewed by the one of said n number of viewers to which the image sequence including the single presently displayed image frame is assigned, generating image frame view block signals in response to the display by the display means of the presently displayed frame, whereby the generated image frame view block signals correspond to all of the n number of viewers except for the one of said n number of viewers to which the image sequence including the single presently displayed image frame is assigned, and selectively blocking, in response to said generated image frame view block signals, all of said n number of viewer's views of the display screen except for the one of said n number of viewers to which the image sequence including the single presently displayed image frame is assigned. The number n may be in the range of 2 to 10.

Figure 3:
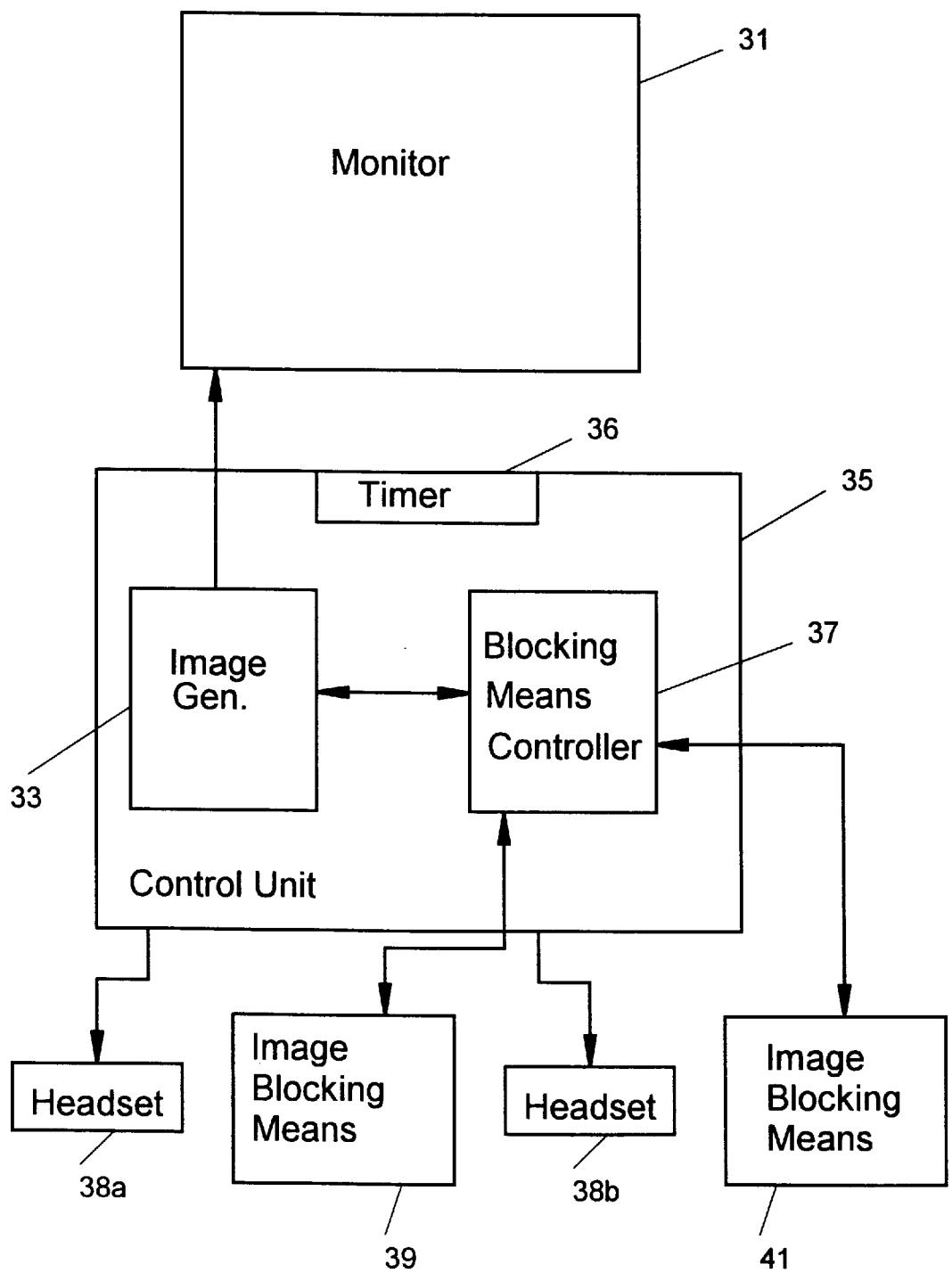
FIG. 3 is a block diagram of a first embodiment of the instant invention.

Referring now to FIG. 3, a first embodiment of the instant invention is shown. As seen in this Fig., monitor 31 is viewed by a plurality of viewers (not shown). In this first embodiment, two viewers are supported, although another number of viewers, such as between 2 and 10, for example, may of course be supported. In any case, an image generator 33, which is shown as an element of control unit 35 in this embodiment generates images to be displayed on the monitor 31.

Figure 4:
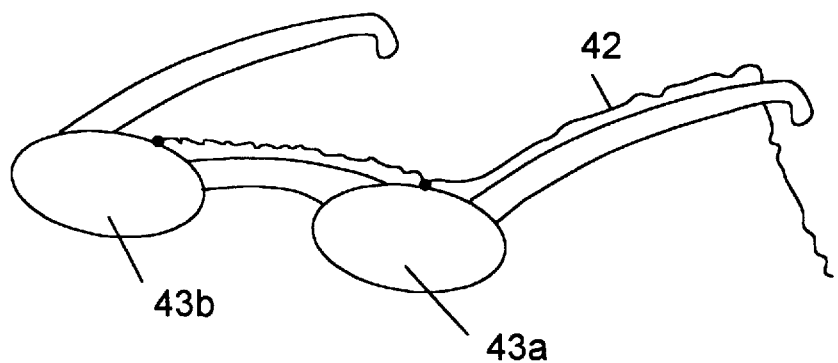
FIG. 4 depicts an eyeglass type view blocking means which may be used with the instant invention.
Figure 5:
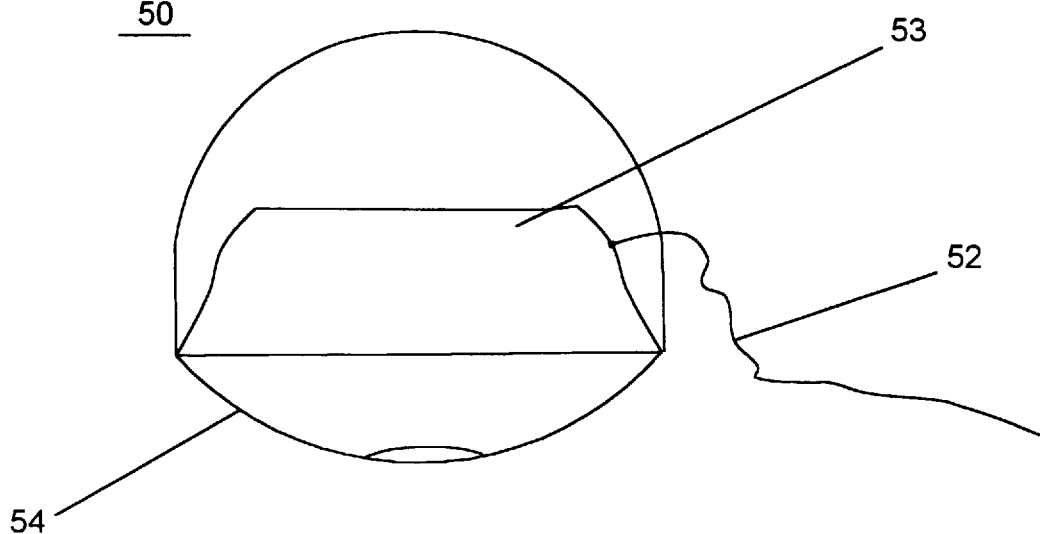
FIG. 5 depicts a helmet type view blocking means which may be used with the instant invention.

Blocking means controller 37, also within control unit 35, provides image block control signals to image blocking means 39 and 41. Image blocking means 39 is adapted to selectively block the vision of a first viewer (not shown). Likewise, image blocking means 41 is adapted to selectively block the vision of a second viewer (not shown). FIG. 4 shows, as element 40, a spectacle-type embodiment of the image blocking means of the instant invention. A wire 42 leads from the control unit 35 of FIG. 3 to the lenses 43a and 43b of element 40 of FIG. 4. FIG. 5 shows, as element 50, a helmet-type embodiment of the image blocking means of the instant invention. A wire 52 leads from the control unit 35 of FIG. 3 to the lens 53 of element 50 of FIG. 5. Element 54 of FIG. 5 is an optional chin strap. Both the spectacle-type image blocking means 40 and the helmet-type image blocking means 50 are adapted to block the view of both of the viewer's eyes. The image blocking means may include LCD lenses, mechanical shutters, or other similar electrical or mechanical devices as known by those of ordinary skill in the art.

Blocking means controller 37 is adapted to output an image block control signal to image blocking means 41 of FIG. 3 when the image to be seen only by the first viewer is generated by image generator 33. Upon receipt of the image block control signal the image blocking means 41 blocks the vision of the second viewer. On the other hand, blocking means controller 37 is adapted to output an image block control signal to image blocking means 39 when the image to be seen only by the second viewer is generated by image generator 33. Upon receipt of the image block control signal the image blocking means 39 blocks the vision of the first viewer.

In operation, the image generator 33 of the embodiment of the instant invention shown in FIG. 3 may present two sequences of images on the monitor 31. These two sequences of images will be referred to as image sequence A and image sequence B. Image sequence A, which is intended to be viewed only by the first viewer, for example, may include image frames $A_1$, $A_2$, and $A_3$, which are seen respectively in FIGS. 6(a), 6(c), and 6(e). Likewise, image sequence B, which is intended to be viewed only by the second viewer, for example, may include image frames $B_1$, $B_2$, and $B_3$, which are seen respectively in FIGS. 6(b), 6(d), and 6(f). Of course, the image sequences may include any number of image frames and these sets of three frames are discussed here simply to explain the operation of this embodiment of the invention.

In any case, first and second image blocking means 39 and 41 of FIG. 3 are shown schematically under monitor 31 in each of FIGS. 6(a)–6(f). When the image blocking means 39 or 41 is shown as an empty rectangle, that indicates that the image blocking means is in a transparent mode (the viewer's view is not blocked). In contrast, when the image blocking means 39 or 41 is shown as a shaded rectangle, that indicates that the image blocking means is in an opaque mode (the viewer's view is blocked). Thus, FIG. 6(a) shows that when image frame $A_1$ of image sequence A is displayed on the monitor (said image frame and image sequence being intended to be viewed only by the first viewer), first image blocking means 39 (corresponding to the first viewer) is substantially transparent and second image blocking means 41 (corresponding to the second viewer) is substantially opaque. The next Fig., FIG. 6(b) shows that when image frame $B_1$ of image sequence B is displayed on the monitor (said image frame and image sequence being intended to be viewed only by the second viewer), first image blocking means 39 (corresponding to the first viewer) is substantially opaque and second image blocking means 41 (corresponding to the second viewer) is substantially transparent. The remaining FIGS. 6(c)–6(f) show the display of image frames $A_2$ and $A_3$ of image sequence A, the display of image frames $B_2$ and $B_3$ of image sequence B, and the states of image blocking means 39 and 41 during such display of image frames $A_2$, $A_3$, $B_2$, and $B_3$.

FIG. 7 shows a timing diagram of the inventive apparatus of FIG. 3. This timing diagram, in which image frames $A_1$, $A_2$, and $A_3$ of image sequence A and image frames $B_1$, $B_2$, and $B_3$ of image sequence B correspond to those of FIGS. 6(a)–6(f), again shows that the first image blocking means 39 is transparent when image frames $A_1$, $A_2$, and $A_3$ are seen by the first viewer and opaque when image frames $B_1$, $B_2$, and $B_3$ are seen by the second viewer. In contrast, the second image blocking means 41 is transparent when image frames $B_1$, $B_2$, and $B_3$ are seen by the second viewer and opaque when image frames $A_1$, $A_2$, and $A_3$ are seen by the first viewer.

It is noted that in this embodiment the image blocking means remain opaque as long as an image blocking signal is received from the control means (said image blocking signal being generated by the control means for substantially the same length of time that an image frame to be viewed corresponding to that image blocking means is displayed).

However, in another embodiment, in which the same elements of FIG. 3 are utilized, the image blocking means may remain opaque for a predetermined period of time after the appropriate image blocking signal is received from the control means. In this regard, the control means may include a timer 36 to determine when such predetermined periods of time have elapsed. Since the instant invention essentially time-multiplexes the frames of the different image sequences, the predetermined time period will optimally be substantially equal to the frame refresh rate of the monitor divided by the number of viewers.

Figure 8:
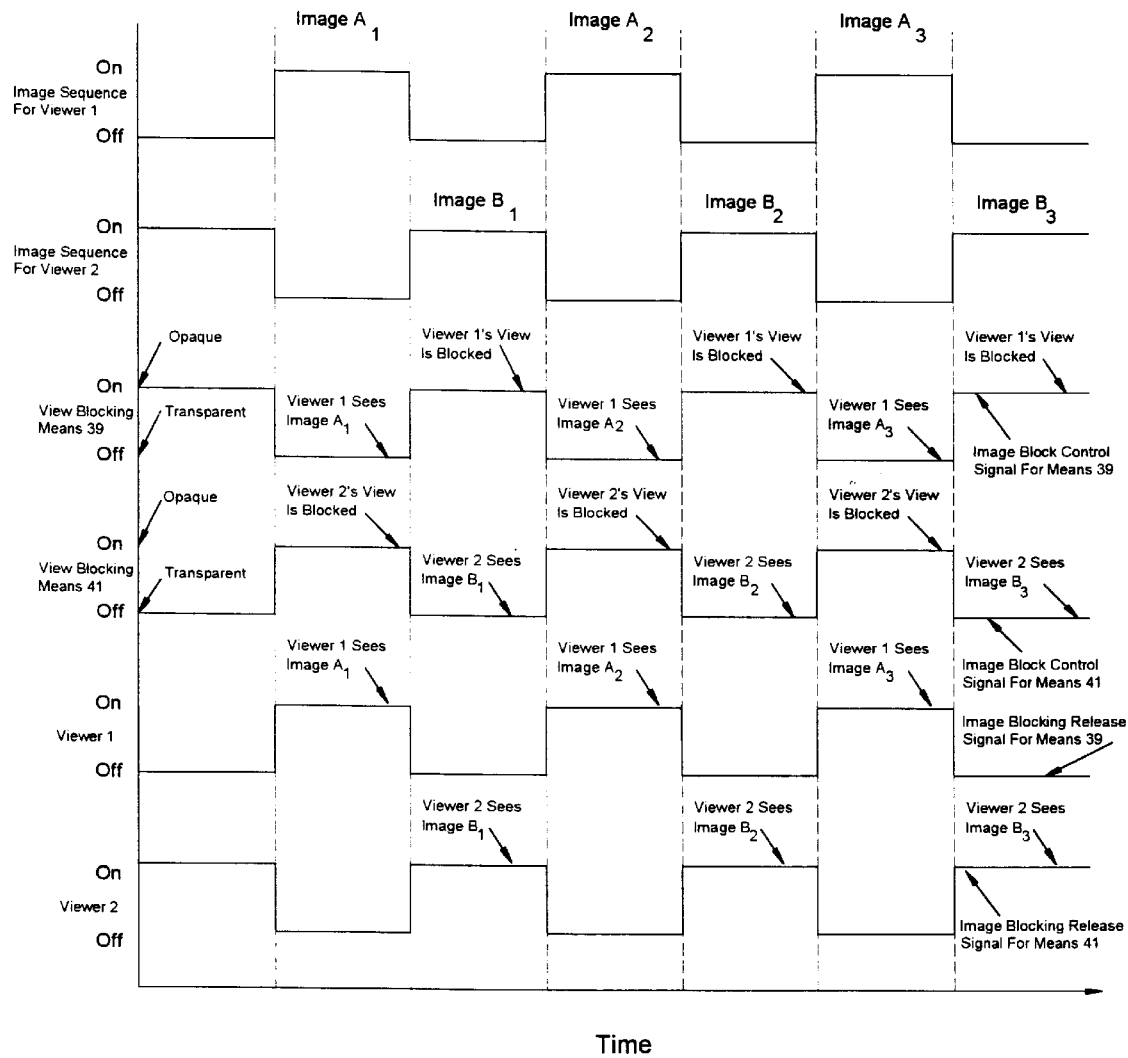
FIG. 8 depicts a timing diagram for another embodiment of the instant invention.

Further, in another embodiment, the image blocking means may enter the opaque state when an image blocking signal is received from the control means and the image blocking means may remain in this state until an image blocking release signal is received from the control means, in which case the image blocking means would return to the transparent state and remain in such a state until the receipt of another image blocking signal. That is, the image blocking signal and the image blocking release signal from the control means may act as toggles for transferring the image blocking means between the opaque state and the transparent state. A timing diagram for this embodiment of the invention is shown in FIG. 8.

It must be noted that any number of image blocking means may be utilized to support a respective number viewers. When two viewers are supported, the image frames seen by each viewer are time-multiplexed, wherein out of the total image frame display time the first viewer's view is blocked one-half of the time and the second viewer's view is blocked one-half of the time. Thus, when the monitor frame refresh rate is 72 Hz, for example, the effective refresh rate for each of the first and second viewers is 36 Hz.

Likewise, when three viewers are supported, the effective refresh rate for each viewer is substantially ⅓ of the monitor refresh rate. Accordingly, in general terms, since the effective refresh rate for each viewer is substantially equal to the frame refresh rate divided by the number of viewers, the use of a high frame refresh rate is preferable.

Finally, regarding audio output, the viewers would preferably be provided with individual headsets (shown in FIG. 3 as 38a and 38b). The audio output provided to each viewer would correspond to that particular viewer's view. The headsets may receive audio output from the control unit 35 of FIG. 3 through a wired link, an optical link, or a radio-frequency link, for example.

While a number of embodiments of the instant invention have been described, it is understood that these embodiments are illustrative only, and not restrictive, and that many modifications may become apparent to those of skill in the art. For example, the invention may be used for a number of different simulations and/or games such as a boxing game in which each of two players, for example, see first person perspective views covering the entire monitor screen, race games, and fighter/tank simulators, etc. Various elements of the invention may be embodied in computer software, firmware, or hardware, such as a microprocessor. The instant invention may be embodied in a personal computer or a stand-alone video game. Two or more television programs or movies may be shown on a single television monitor using the instant invention. Such television programs or movies may be shown on monitors utilizing NTSC, PAL, or High Definition TV (HDTV) formats, for example, and two or more tuners or other sources (such as VCRs or Videodiscs) may be used to present video and/or audio material to the viewers.

What is claimed is:

1. An apparatus for displaying a first multi-color image on a multi-color display screen exclusively to a first viewer and a second multi-color image on the display screen exclusively to a second viewer, comprising:

control means for selectively displaying said first image and said second image on the display screen and for generating a second viewer image block signal when said first image is displayed and a first viewer image block signal when said second image is displayed;

first viewer image blocking means responsive to said first viewer image block signal generated by said control means for blocking the first viewer's view of the display screen when said first viewer image block signal is received and for permitting substantially unattenuated passage of multi-color light therethrough at other times; and second viewer image blocking means responsive to said second viewer image block signal from said control means for blocking the second viewer's view of the display screen when said second viewer image block signal is received and for permitting substantially unattenuated passage of multi-color light therethrough at other times.

2. An apparatus for displaying a first image on a display screen exclusively to a first viewer and a second image on the display screen exclusively to a second viewer, comprising:

control means for selectively displaying said first image and said second image on the display screen and for generating a second viewer image block signal when said first image is displayed and a first viewer image block signal when said second image is displayed;

first viewer image blocking means responsive to said first viewer image block signal generated by said control means for blocking the first viewer's view of the display screen when said first viewer image block signal is received; and second viewer image blocking means responsive to said second viewer image block signal from said control means for blocking the second viewer's view of the display screen when said second viewer image block signal is received;

wherein said first viewer image blocking means comprises at least a first liquid crystal lens and said second viewer image blocking means comprises at least a second liquid crystal lens, whereby said first liquid crystal lens turns from a substantially transparent state to a substantially opaque state when the first viewer image blocking means receives the first viewer image block signal and whereby said second liquid crystal lens turns from a substantially transparent state to a substantially opaque state when the second viewer image blocking means receives the second viewer image block signal.

3. The apparatus of claim 2, wherein said first liquid crystal lens of said first viewer image blocking means is mounted to a first helmet and said second liquid crystal lens of said second viewer image blocking means is mounted to a second helmet.

4. The apparatus of claim 2, wherein said first liquid crystal lens comprises a first right eye lens and a first left eye lens and said second liquid crystal lens comprises a second right eye lens and a second left eye lens.

5. The apparatus of claim 4, wherein said first right eye lens and said first left eye lens of said first viewer image blocking means are mounted to first eyeglass frames and said second right eye lens and said second left eye lens of said second viewer image blocking means are mounted to second eyeglass frames.

6. The apparatus of claim 1, wherein said control means generates the first viewer image block signal for a first viewer predetermined time period during which the first viewer image blocking means blocks the first viewer's view of the display screen and said control means generates the second viewer image block signal for a second viewer predetermined time period during which the second viewer image blocking means blocks the second viewer's view of the display screen.

7. The apparatus of claim 6, wherein said first viewer predetermined time period and said second viewer predetermined time period are substantially equal.

8. The apparatus of claim 1, wherein said control means generates a first viewer block release signal when said first image is displayed and a second viewer block release signal when said second image is displayed, whereby said first viewer image blocking means is responsive to said first viewer image block signal generated by said control means and said first viewer block release signal generated by said control means for blocking the first viewer's view of the display screen when said first viewer image block signal is received and for not blocking the first viewer's view of the display screen when said first viewer block release signal is received and whereby said second viewer image blocking means is responsive to said second viewer image block signal generated by said control means and said second viewer block release signal generated by said control means for blocking the second viewer's view of the display screen when said second viewer image block signal is received and for not blocking the second viewer's view of the display screen when said second viewer block release signal is received.

9. An apparatus for displaying on a multi-color display screen a first image sequence exclusively to a first viewer and a second image sequence exclusively to a second viewer, said first image sequence including a respective plurality of multi-color image frames and said second image sequence including a respective plurality of multi-color image frames, comprising:

control means for alternately displaying in an interlaced fashion each of said image frames of said first image sequence and each of said image frames of said second image sequence on the display screen and for generating a second viewer image block signal when each of said image frames of said first image sequence are displayed and a first viewer image block signal when each of said image frames of said second image sequence are displayed;

first viewer image blocking means responsive to said first viewer image block signal generated by said control means for blocking the first viewer's view of the display screen when said first viewer image block signal is received and for permitting substantially unattenuated passage of multi-color light therethrough at other times; and second viewer image blocking means responsive to said second viewer image block signal from said control means for blocking the second viewer's view of the display screen when said second viewer image block signal is received and for permitting substantially unattenuated passage of multi-color light therethrough at other times.

10. An apparatus for displaying on a display screen a first image sequence exclusively to a first viewer and a second image sequence exclusively to a second viewer, said first image sequence including a respective plurality of image frames and said second image sequence including a respective plurality of image frames, comprising:

control means for alternately displaying in an interlaced fashion each of said image frames of said first image sequence and each of said image frames of said second image sequence on the display screen and for generating a second viewer image block signal when each of said image frames of said first image sequence are displayed and a first viewer image block signal when each of said image frames of said second image sequence are displayed;

first viewer image blocking means responsive to said first viewer image block signal generated by said control means for blocking the first viewer's view of the display screen when said first viewer image block signal is received; and second viewer image blocking means responsive to said second viewer image block signal from said control means for blocking the second viewer's view of the display screen when said second viewer image block signal is received;

wherein said first viewer image blocking means comprises at least a first liquid crystal lens and said second viewer image blocking means comprises at least a second liquid crystal lens, whereby said first liquid crystal lens turns from a substantially transparent state to a substantially opaque state when the first viewer image blocking means receives the first viewer image block signal and whereby said second liquid crystal lens turns from a substantially transparent state to a substantially opaque state when the second viewer image blocking means receives the second viewer image block signal.

11. The apparatus of claim 10, wherein said first liquid crystal lens of said first viewer image blocking means is mounted to a first helmet and said second liquid crystal lens of said second viewer image blocking means is mounted to a second helmet.

12. The apparatus of claim 10, wherein said first liquid crystal lens comprises a first right eye lens and a first left eye lens and said second liquid crystal lens comprises a second right eye lens and a second left eye lens.

13. The apparatus of claim 12, wherein said first right eye lens and said first left eye lens of said first viewer image blocking means are mounted to first eyeglass frames and said second right eye lens and said second left eye lens of said second viewer image blocking means are mounted to second eyeglass frames.

14. The apparatus of claim 9, wherein said control means generates the first viewer image block signal for a first viewer predetermined time period during which the first viewer image blocking means blocks the first viewer's view of the display screen and said control means generates the second viewer image block signal for a second viewer predetermined time period during which the second viewer image blocking means blocks the second viewer's view of the display screen.

15. The apparatus of claim 14, wherein said first viewer predetermined time period and said second viewer predetermined time period are substantially equal.

16. The apparatus of claim 9, wherein said control means generates a first viewer block release signal when said first image is displayed and a second viewer block release signal when said second image is displayed, whereby said first viewer image blocking means is responsive to said first viewer image block signal generated by said control means and said first viewer block release signal generated by said control means for blocking the first viewer's view of the display screen when said first viewer image block signal is received and for not blocking the first viewer's view of the display screen when said first viewer block release signal is received and whereby said second viewer image blocking means is responsive to said second viewer image block signal generated by said control means and said second viewer block release signal generated by said control means for blocking the second viewer's view of the display screen when said second viewer image block signal is received and for not blocking the second viewer's view of the display screen when said second viewer block release signal is received.

17. An apparatus for displaying on a multi-color display screen, exclusively to each of n number of viewers, a respective one of n number of image sequences, each of said n number of image sequences including a respective plurality of multi-color image frames and each of said n number of image sequences being assigned to a respective one of said n number of viewers, comprising:

display means for alternately displaying on the display screen an image frame from each of said n image sequences in an interlaced fashion, whereby at any one time there is a single presently displayed image frame from one of said n number of image sequences which is viewed by the one of said n number of viewers to which the image sequence including the single presently displayed image frame is assigned;

signal generation means for generating image frame view block signals in response to the display by the display means of the presently displayed frame, whereby the generated image frame view block signals correspond to all of the n number of viewers except for the one of said n number of viewers to which the image sequence including the single presently displayed image frame is assigned; and n number of viewer image blocking means, each corresponding to one of said n number of viewers, responsive to the image frame view block signals for selectively blocking all of said n number of viewer's views of the display screen except for the one of said n number of viewers to which the image sequence including the single presently displayed image frame is assigned and for permitting substantially unattenuated passage of multi-color light therethrough at other times.

18. The apparatus of claim 17, wherein said n number of viewer image blocking means block all of said n number of viewer's views of the display screen except for the one of said n number of viewers to which the image sequence including the single presently displayed frame is assigned for a predetermined time period after said image frame view block signals are received.

19. The apparatus of claim 17, wherein said number n is in the range of 2 to 10.

20. The apparatus of claim 1, wherein said display screen is incorporated into one of an NTSC format television, a PAL format television, and a High Definition television.

21. The apparatus of claim 9, wherein said display screen is incorporated into one of an NTSC format television, a PAL format television, and a High Definition television.

22. The apparatus of claim 17, wherein said display screen is incorporated into one of an NTSC format television, a PAL format television, and a High Definition television.

* * * * *